United States Patent Office 3,496,734
Patented Feb. 24, 1970

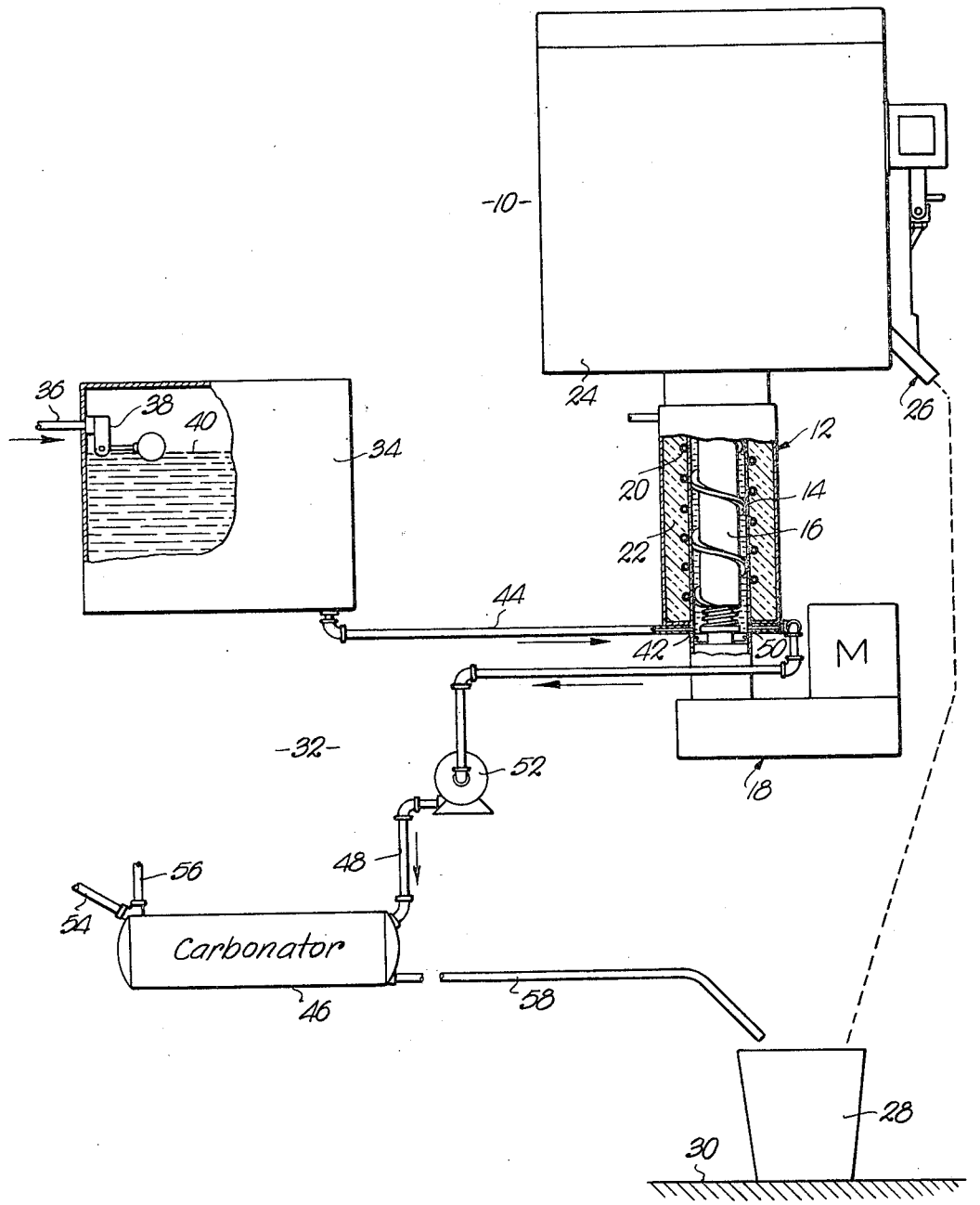

3,496,734
WATER SUPPLY SYSTEM FOR PARTICULATE ICE MAKER
Warner A. J. Schumacher, Prairie Village, Kans., assignor to The Vendo Company, Kansas City, Mo., a corporation of Missouri
Filed May 13, 1968, Ser. No. 728,482
Int. Cl. F25c 1/00; B67d 5/62
U.S. Cl. 62—304                                                  5 Claims

ABSTRACT OF THE DISCLOSURE

A cold beverage dispensing machine of the type having an ice making unit, water supply structure, a dispensing station for supporting a cup in disposition to receive ice from the ice making unit and a carbonator for directing carbonated water after mixture thereof with syrup to the cup at the dispensing station, and wherein the conduit means for directing water to the carbonator from the water supply structure is connected to the evaporator of the ice making unit so that the water must pass through the evaporator on the way from the water supply structure to the carbonator whereby a common conduit serves to supply both the evaporator and the carbonator so that accumulation of foreign material in the supply line to the ice maker is prevented.

---

This invention relates to dispensing machines for cold beverages of the type wherein upon actuation of the machine a cup is first directed to a station, and then ice in particulate form and a carbonated beverage thereafter directed into the cup. In particular, the invention is concerned with a novel water supply system which provides not only all of the water needed for preparing beverages to be dispensed but also supplies the ice maker in a manner such that accumulation of slime in the conduit leading to the ice maker is prevented.

A typical ice maker for producing particulate ice and which may be used in a dispensing machine of the type described wherein both a quantity of the ice and a carbonated beverage are delivered to a cup positioned at the dispensing station of the machine, is illustrated in U.S. Patent No. 3,196,628. As shown therein, the evaporator unit of the ice maker comprises an upright cylinder which receives a rotatable auger that is operable to scrape ice from the interior wall of the cylinder as the ice forms thereon and to direct such ice to the upper end of the cylinder for storage in a dispensing hopper. A predetermined level of water is maintained in the freezing cylinder so that control of the ice making function of the unit is dependent only upon supply of refrigerant to the evaporator and rotation of the auger therewithin.

In present ice making equipment of the type shown in U.S. Patent No. 3,196,628 when used to supply particulate ice for delivery to a cup at the dispensing station of a cold drink dispenser, there is a tendency for certain bacteria and algae to accumulate in the water supply line leading to the evaporator unit of the ice maker. Accumulation of such slime in the water supply line occurs very quickly in some geographical areas because of certain water conditions and which appear to be conducive to growth of biological organisms. As a result, the water supply line leading to the ice maker is subject to complete blockage and is a constant source of trouble and expense to the operator of the beverage dispensing machine. The bacterial growth is encouraged by water standing dormant in the supply line for relatively long periods of time.

The water supply systems for furnishing the water needed to prepare the beverages dispensed from a conventional cold beverage dispenser usually include a vessel which is adapted to maintain a predetermined amount of water in storage for supplying the carbonator tank of the machine. A conduit is also normally provided between the carbonator water supply line and the evaporator unit of the ice maker to supply water to the evaporator in response to the demand for such water. However, during the period when water is directed into the evaporator of the ice maker from the main water supply conduit, the flow rate of the water in the bypass line to the ice maker is not adequate for flushing out the water supply line. In fact, during ice production periods utilizing an ice maker of the general type shown in U.S. Patent No. 3,196,628, it is conventional for only approximately two to three ounces per minute of water to be directed to the evaporator of the ice maker.

It is therefore the object of this invention to provide a water supply system for a beverage dispensing machine of the type having a particulate ice maker for delivery of ice to a cup at the beverage dispensing station, wherein the water supplied to the carbonator for preparing all beverages dispensed from the machine, is directed through the line leading to the ice maker so that there is no tendency for bacteria or algae to accumulate in the ice maker water supply line. This is true because of frequent flushing of the water supply conduit as water is directed from the supply source to the carbonating equipment. In this connection, the ice maker is also supplied with fresh water at all times thus preventing the accumulation of undesirable mineral as well as biological deposits therein.

The single figure of the drawing is an essentially schematic representation of a water supply system constructed in accordance with the preferred concepts of the present invention and especially useful in a beverage dispensing machine having a particulate ice maker for delivering ice to each beverage cup as a combination of carbonated water and syrup is also directed into the cup.

The ice making unit 10 conventionally has an evaporator 12 provided with an upright cylinder 14 which houses a rotatable auger 16 rotated by the drive assembly 18. Refrigerant coils 20 surround cylinder 14 and are protected by insulation 22. A storage and dispensing hopper 24 on evaporator 12 includes selectively operable gate structure 26 for controlling delivery of particulate ice to a cup 28 located at the dispensing station 30 of the cold beverage dispensing machine which is not shown in complete detail since the components thereof are well known.

Although one type of ice making unit has been shown schematically in the drawing, it is to be understood that this mechanism is representative only of ice making apparatus which may be used and the principles of the present invention apply equally well to other types of ice makers.

The water supply system 32 of the cold beverage dispensing machine includes a water storage vessel 34 provided with a water supply line 36 coupled thereto with control structure 38 being shown schematically for maintaining water in vessel 34 as a predetermined level 40. It is to be understood that the control structure 38 is shown in schematic form only and may comprise various types of valve assemblies under the control of mechanical or electromechanical water level sensing devices.

The cylinder 14 of ice making unit 10 has a water inlet opening 42 therein had conduit 44 joins opening 42 to the bottom of vessel 34.

The carbonator tank 46 of the beverage dispensing machine has a water supply conduit 48 connected to one end thereof and to the water outlet opening 50 of evaporator cylinder 14. Pump 52 interposed in conduit 48 between tank 46 and cylinder 14 is adapted to force a stream of water into tank 46 under relatively high pressure and at a sufficient velocity for efficient carbonation of the water by carbon dioxide supplied through the line 54 connected to tank 46. The line 56 leads to pressure sensing control structure forming a part of the dispensing machine for maintaining the pressure of carbon dioxide in carbonator tank 46 at a selected level. The outlet line 58 leading from tank 46 terminates adjacent station 30 in disposition to direct carbonated water into the cup 28.

Although not detailed in the drawing it is to be understood that syrup may be mixed with the carbonated water prior to delivery of the latter into the cup 28 using conventional valve mixing units. In addition, the carbonator tank 46 may desirably be of the type shown in U.S. Patent No. 2,733,850 although other types of carbonators have equal utility in this invention. As a consequence the carbonator shown is intended to be representative only.

Water level sensing structure is normally provided in carbonator tank 46 for maintaining the level of carbonated water therein at a predetermined height. This control structure is connected to pump 52 and a valve (not shown) in conduit 48.

When the level of water in carbonator tank 46 falls to a height sensed by the level sensing structure therein, the valve in conduit 48 is opened and pump 52 is operated to direct water into the right hand end of tank 46. During this interval of operation, water is usually supplied through conduits 44 and 48 to tank 46 to a flow rate in the range of 50 to 100 ounces per minute. As a result, the water flowing through such conduit is moving at a velocity to flush out any materials which have commenced to accumulate therein. The water level control structure in tank 46 discontinues the supply of water thereto when the level in the tank reaches a predetermined height. Since all water used in preparing the cold beverages dispensed from the machine at station 30 is obtained from system 32, water flows through conduits 44 and 48 at sufficiently frequent intervals to preclude accumulation of slime therein.

Also, because of the fact that water is supplied to the cylinder 14 of evaporator 12 and maintained at a level therein equal to the level 40 of water in vessel 34, a supply of water is provided for the ice making unit 10 at all times regardless of whether or not carbonator tank 46 is being supplied with water.

Having thus described the invention, what is claimed as new and desired to be secured by Letters Patent is:

1. In a cold beverage dispensing machine, the combination of:
    an ice making unit having an upright evaporator assembly provided with a water receiving chamber defined at the lower end thereof by bottom structure and operable to freeze a part of the water received therein said assembly being provided with a water inlet and a water outlet; communicating with the chamber, at least said outlet being located substantially at the level of said bottom structure of the assembly;
    a dispensing station adapted to support a receptacle in disposition to receive ice from the ice making unit;
    water supply structure;
    first conduit means joining the water supply structure to said water inlet of the evaporator for supplying water thereto; and
    second conduit means connected to said water outlet of the evaporator and leading to said station for delivering water from the evaporator assembly to the receptacle thus causing water supplied by the structure and used in the preparation of all beverages dispensed from the machine to be directed through the evaporator assembly so that accumulation of slime in said conduit means and the lower part of the evaporator assembly is prevented.

2. A cold beverage dispensing machine as set forth in claim 1, wherein is provided means interposed in said second conduit means for introducing carbon dioxide into the water to cause carbonated water to be delivered to the receptacle at said station.

3. In a cold beverage dispensing machine, the combination of:
    an ice making unit having an upright evaporator assembly provided with an open type, upright cylinder and a rotatable auger within the cylinder operable to shave ice from the interior wall of the cylinder which forms thereon and direct such ice toward the top of the cylinder, said cylinder being provided with openings therein adjacent the lower part thereof presenting a water inlet and water outlet respectively;
    a dispensing station adapted to support a receptacle in disposition to receive ice from the ice making unit;
    first conduit means joining the water supply structure to said water inlet of the evaporator for supplying water thereto; and
    second conduit means connected to said water outlet of the evaporator and leading to said station for delivering water from the evaporator assembly to the receptacle thus causing water supplied by the structure and used in the preparation of all beverages dispensed from the machine to be directed through the evaporator assembly so that accumulation of slime in said conduit means and the lower part of the evaporator assembly is prevented.

4. A cold beverage dispensing machine as set forth in claim 3, wherein the carbon dioxide supply means includes a carbonator tank interposed in said second conduit means and a pump in said second conduit means between the evaporator assembly and said carbonator tank.

5. A cold beverage dispensing machine as set forth in claim 3, wherein said water supply structure includes a storage vessel positioned relative to said evaporator assembly to maintain water in said cylinder at a predetermined level determined by the level of water in said vessel.

References Cited

UNITED STATES PATENTS

| | | | |
|---|---|---|---|
| 2,134,787 | 11/1938 | Hartman | 62—306 X |
| 3,359,748 | 12/1967 | Booth | 62—70 X |
| 3,369,376 | 2/1968 | Kious | 62—304 X |

WILLIAM E. WAYNER, Primary Examiner

U.S. Cl. X.R.

62—354, 393; 137—12.5